United States Patent
Fuentes et al.

(10) Patent No.: US 11,679,816 B2
(45) Date of Patent: Jun. 20, 2023

(54) VEHICLE BODY STRUCTURE

(71) Applicants: Nissan North America, Inc., Franklin, TN (US); NISSAN MOTOR CO., LTD., Yokohama (JP)

(72) Inventors: Bobby Fuentes, Canton, MI (US); Fumio Tejima, Kanagawa (JP); Satoshi Sakurai, Kanagawa (JP); Atsushi Adachi, Kanagawa (JP)

(73) Assignee: NISSAN NORTH AMERICA, INC., Franklin, TN (US)

( * ) Notice: Subject to any disclaimer, the term of this patent is extended or adjusted under 35 U.S.C. 154(b) by 48 days.

(21) Appl. No.: 17/425,642

(22) PCT Filed: Feb. 22, 2019

(86) PCT No.: PCT/US2019/019159
§ 371 (c)(1),
(2) Date: Jul. 23, 2021

(87) PCT Pub. No.: WO2020/171820
PCT Pub. Date: Aug. 27, 2020

(65) Prior Publication Data
US 2022/0097768 A1    Mar. 31, 2022

(51) Int. Cl.
*B62D 27/02* (2006.01)
*B62D 25/04* (2006.01)
*B62D 25/06* (2006.01)

(52) U.S. Cl.
CPC .......... *B62D 27/023* (2013.01); *B62D 25/04* (2013.01); *B62D 25/06* (2013.01)

(58) Field of Classification Search
CPC ...... B62D 25/04; B62D 25/06; B62D 27/023; B62D 25/02
(Continued)

(56) References Cited

U.S. PATENT DOCUMENTS 3,776,589 A    12/1973    Barenyi et al.
8,210,602 B2 *  7/2012    Kobayashi ........... B62D 21/157
                                              296/193.06
(Continued)

FOREIGN PATENT DOCUMENTS

DE    102011119560 A1    5/2013
WO      2011024552 A1    3/2011

OTHER PUBLICATIONS

Extended European Search Report dated Oct. 10, 2022 in the counterpart European patent application.
(Continued)

*Primary Examiner* — Jason S Morrow
(74) *Attorney, Agent, or Firm* — Global IP Counselors, LLP

(57) ABSTRACT

A vehicle body structure having a side roof rail, a B-pillar and a bracket. The side roof rail has an inboard surface. The B-pillar has an upper end portion that overlays a portion of the inboard surface of the roof rail. The B-pillar extends downward from the roof rail. The bracket has a first portion and a second portion. The first portion is fixedly attached to the upper end portion of the B-pillar. The bracket further has a first rib and a second rib spaced apart from the first rib. The first rib and the second rib extend from the first portion of the bracket upward toward the second portion of the bracket. The first portion of the bracket further defines a slot located between the first rib and the second rib.

19 Claims, 9 Drawing Sheets

(58) Field of Classification Search
USPC .................................................. 296/193.06
See application file for complete search history.

(56) References Cited

U.S. PATENT DOCUMENTS

| | | | | |
|---|---|---|---|---|
| 8,678,484 B2* | 3/2014 | Shono | .................. | B62D 27/065 |
| | | | | 296/193.06 |
| 8,740,292 B2* | 6/2014 | Kishi | ..................... | B62D 25/04 |
| | | | | 296/210 |
| 8,960,779 B2* | 2/2015 | Nishimura | ............. | B62D 25/06 |
| | | | | 296/203.03 |
| 9,381,945 B2* | 7/2016 | Gim | ....................... | B62D 25/04 |
| 9,567,012 B2* | 2/2017 | Oshima | ................. | B62D 25/02 |
| 9,764,770 B2* | 9/2017 | Nakanishi | ............... | B62D 25/06 |
| 10,144,455 B2 | 12/2018 | Anegawa et al. | | |
| 10,196,096 B2* | 2/2019 | Sato | ....................... | B62D 25/04 |
| 10,377,421 B2* | 8/2019 | Yoshitake | .............. | B62D 25/06 |
| 10,745,053 B2* | 8/2020 | Terada | .................. | B60R 13/025 |
| 2014/0028057 A1 | 1/2014 | Nishimura et al. | | |
| 2014/0054927 A1 | 2/2014 | Nakamura et al. | | |
| 2014/0312656 A1 | 10/2014 | Gim et al. | | |
| 2016/0107698 A1 | 4/2016 | Oshima et al. | | |
| 2016/0107701 A1 | 4/2016 | Anegawa et al. | | |
| 2016/0129944 A1 | 5/2016 | Nakamura et al. | | |
| 2017/0305470 A1 | 10/2017 | Sato et al. | | |
| 2018/0237074 A1 | 8/2018 | Yoshitake et al. | | |
| 2022/0297760 A1* | 9/2022 | Nagahama | ........... | B62D 27/023 |

OTHER PUBLICATIONS

International Search Report in PCT/US2019/019159 dated May 31, 2019.

Written Opinion, dated May 31, 2019.

\* cited by examiner

VEHICLE BODY STRUCTURE

BACKGROUND

Field of the Invention

The present invention generally relates to vehicle body structure. More specifically, the present invention relates to a vehicle body structure where a side roof rail, a B-pillar, a roof bow and a bracket intersect and connect to one another with attachments between the bracket and the roof bow being more numerous than attachments between the side roof rail and the bracket.

Background Information

Vehicle body structures of vehicles are constantly being tested for responses to various types impact events.

SUMMARY

One object of the present disclosure is to attached a bracket to a side roof rail, a B-pillar and a roof bow with attachments between the bracket and the roof bow being more numerous and stronger than attachments between the side roof rail and the bracket such that the bracket collapses in an area adjacent to the side roof rail in response to side impact events.

In view of the state of the known technology, one aspect of the present disclosure is to provide a vehicle body structure with a side roof rail, a B-pillar and a bracket. The side roof rail has an inboard surface extending in a vehicle longitudinal direction. The B-pillar has an upper end portion that overlays a portion of the inboard surface of the roof rail, the B-pillar extending downward from the roof rail. The bracket has a first portion and a second portion. The first portion is fixedly attached to the upper end portion of the B-pillar. The bracket further has a first rib and a second rib spaced apart from the first rib. The first rib and the second rib extend from the first portion of the bracket upward toward the second portion of the bracket. The first portion of the bracket further defines a slot located between the first rib and the second rib.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
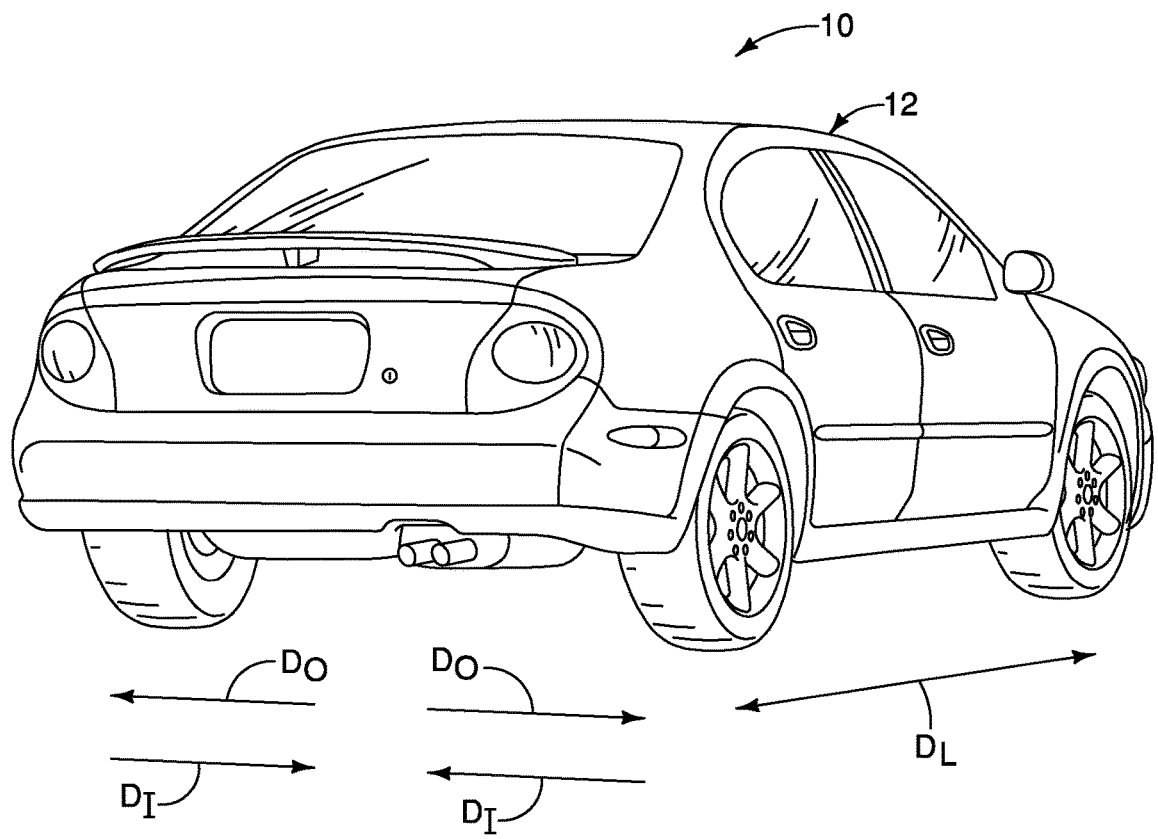
FIG. 1 is a perspective view of a vehicle with a vehicle body structure in accordance with an exemplary embodiment.

Referring initially to FIG. 1, a vehicle 10 having a vehicle body structure 12 is illustrated in accordance with a first embodiment.

The vehicle 10 includes many conventional features, such as suspension, steering, powertrain, electronic and passenger compartment components. Since these features and components are conventional features, further description is omitted for the sake of brevity.

As shown in FIG. 1, a plurality of differing directions is defined relative to the vehicle 10. Those directions include: a vehicle longitudinal direction $D_L$; a vehicle inboard direction $D_I$; and a vehicle outboard direction $D_O$. The vehicle inboard direction $D_I$ and the vehicle outboard direction $D_O$ are defined relative to an imaginary center line of the vehicle 10, where the imaginary center line extends in the vehicle longitudinal direction $D_L$ of the vehicle 10. Reference to inboard and outboard directions, inboard facing surfaces and outboard facing surfaces in the following description are with respect to the above listed vehicle defined directions.

Figure 2:
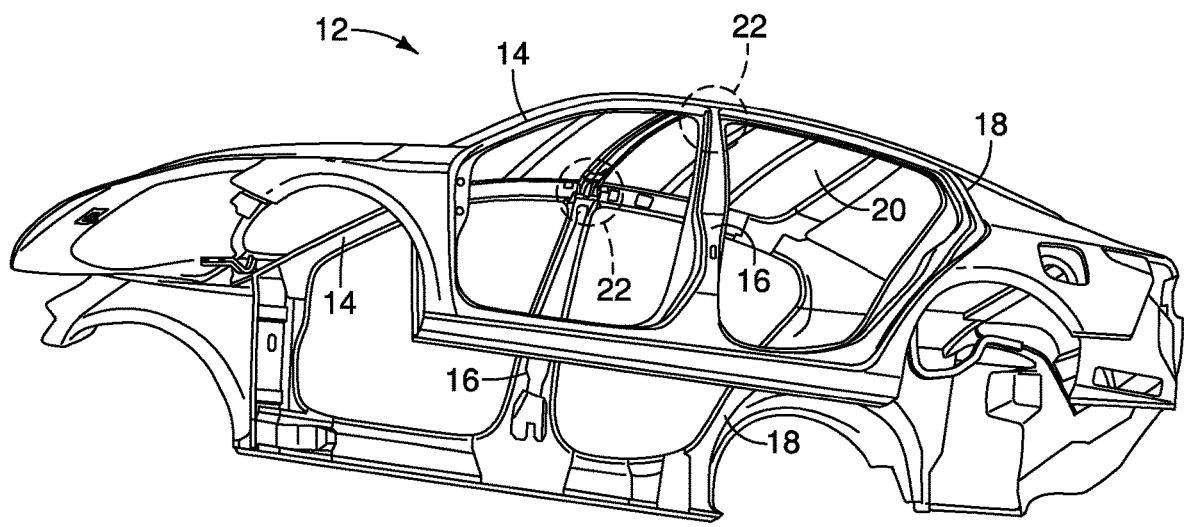
FIG. 2 is a perspective view of the vehicle body structure with trim and mechanical components of the vehicle removed to show a side roof rail, a B-pillar, a roof bow and a bracket that intersect within a circled intersection area in accordance with the exemplary embodiment.
Figure 3:
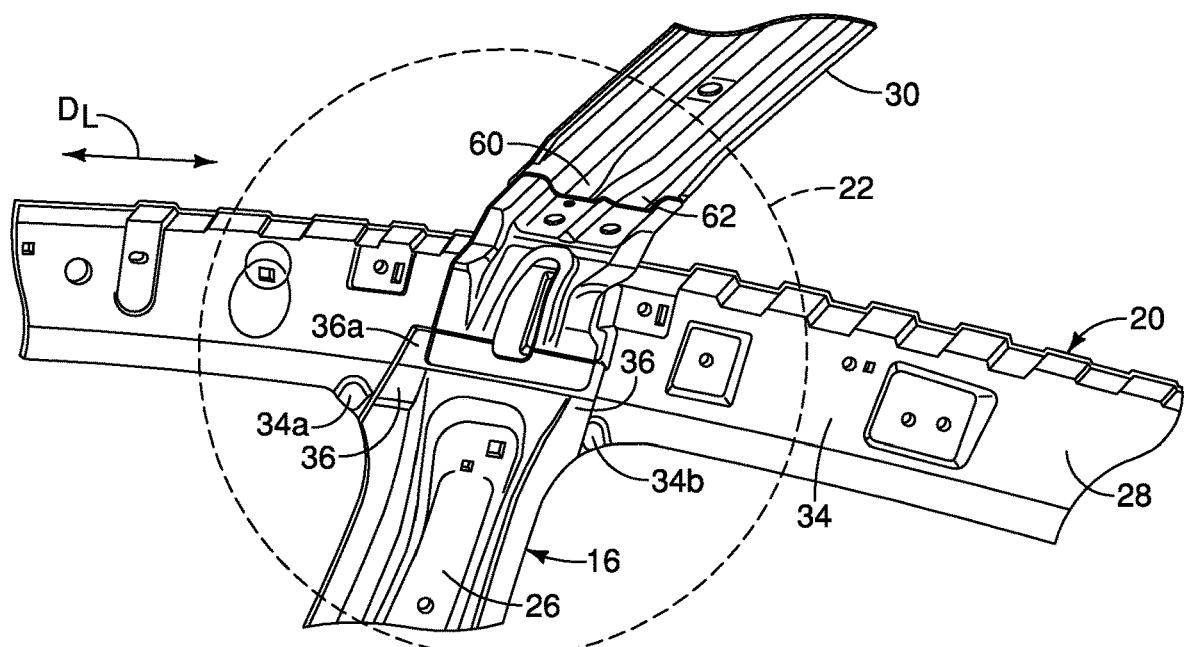
FIG. 3 is a perspective view of the intersection area of the vehicle body structure showing connections between the side roof rail, the B-pillar, the roof bow and the bracket in accordance with the exemplary embodiment.
Figure 4:
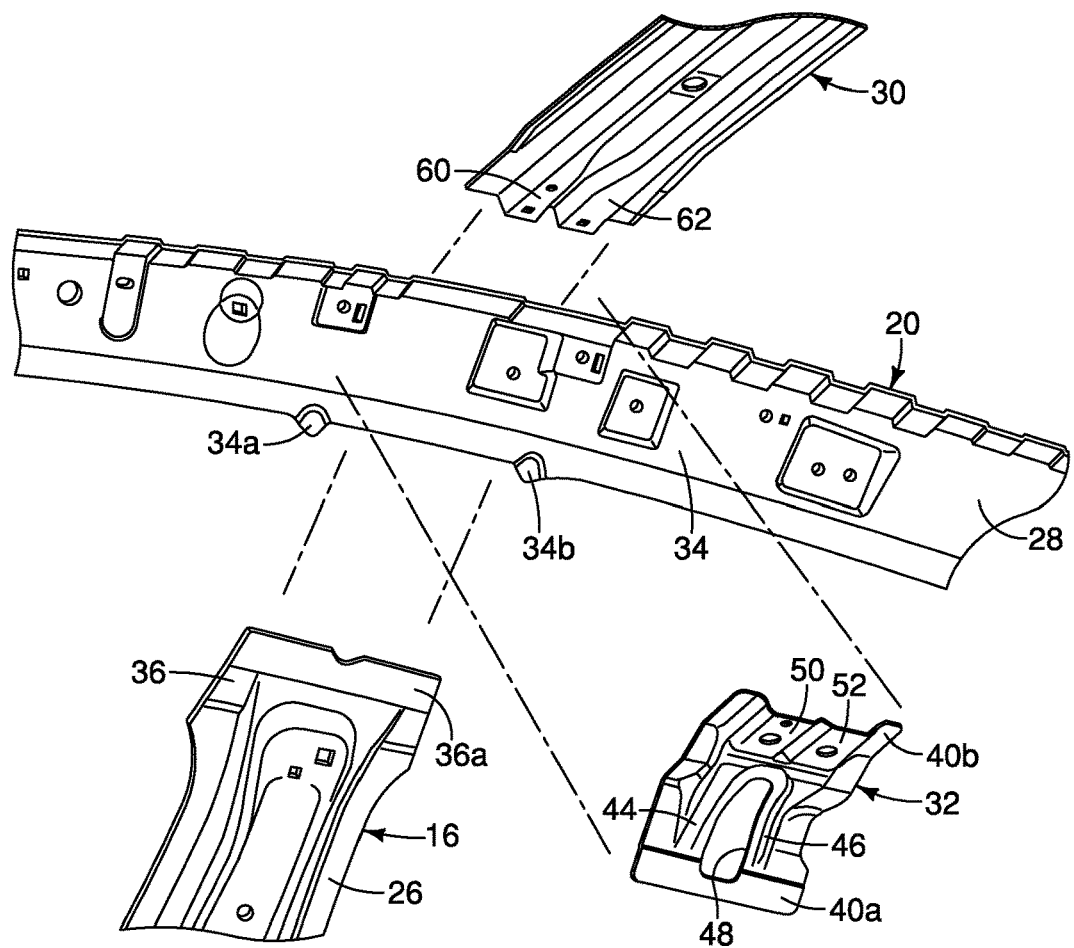
FIG. 4 is an exploded view of portions of the side roof rail, the B-pillar, the roof bow and the bracket within the intersection area in accordance with the exemplary embodiment.

As shown in FIGS. 2, 3 and 4, the vehicle body structure 12 of the vehicle 10 includes many structural elements, many of them welded to one another. The various structural elements of the vehicle body structure 12 define A-pillars 14, B-pillars 16, C-pillars 18 and a roof structure 20. It should be understood from the drawings and the description herein that the A-pillars 14 include a plurality of metallic panels that are welded or otherwise fixed to one another to define each of the A-pillars 14. Similarly, the B-pillars 16 and the C-pillars 18 each include a plurality of metallic panels that are welded or otherwise fixed to one another to define each of the B-pillars 16 and the C-pillars 18. As well, the roof structure 20 further includes a plurality of panels welded or otherwise fixed together to define the roof structure 20.

The features of the vehicle body structure 12 described herein below are located at intersecting areas 22 of the B-pillars 16 and the roof structure 20. These features are configured to provide predetermined levels of strength and rigidity, and, provide predetermined characteristics in response to an impact event were impact to the vehicle 10 is located proximate one of the B-pillars 16, as described in greater detail below. There are two such intersecting areas 22 of the vehicle body structure 12, as shown in FIG. 2. The structures within the intersecting areas 22 are identical to one another, except that they are symmetrical mirror images of one another, being on opposite sides of the vehicle 10. Description of one of the intersecting areas 22 applies equally to the structures within each of the intersecting areas 22. Therefore, description of the structures within only one of the intersecting areas 22 is provided below for the sake of brevity.

FIGS. 3 and 4 show those elements of the vehicle body structure 12 within the intersecting area 22. These elements include an inboard panel 26 of the B-pillar 16, a side roof rail 28 of the roof structure 20, a roof bow 30 of the roof structure 20 and a bracket 32 that is attached to the side roof rail 28, the B-pillar 16 and the roof bow 30, as is described in greater detail below.

It should be understood from the drawings and the description herein that the B-pillar 16 is constructed from a plurality of differing panels welded together in a conventional manner. For purposes of understanding the structures within the intersecting areas 22, only the inboard panel 26 is described hereinbelow for the sake of brevity. Similarly, the roof structure 20 includes a plurality of differing conventional panels and structural elements that are connected to one another by, for example, welding techniques and/or mechanical fasteners. However, for purposes of understanding the structures within the intersecting areas 22, only the side roof rail 28 and the roof bow 30 of the roof structure 20 are described hereinbelow for the sake of brevity.

Figure 5:
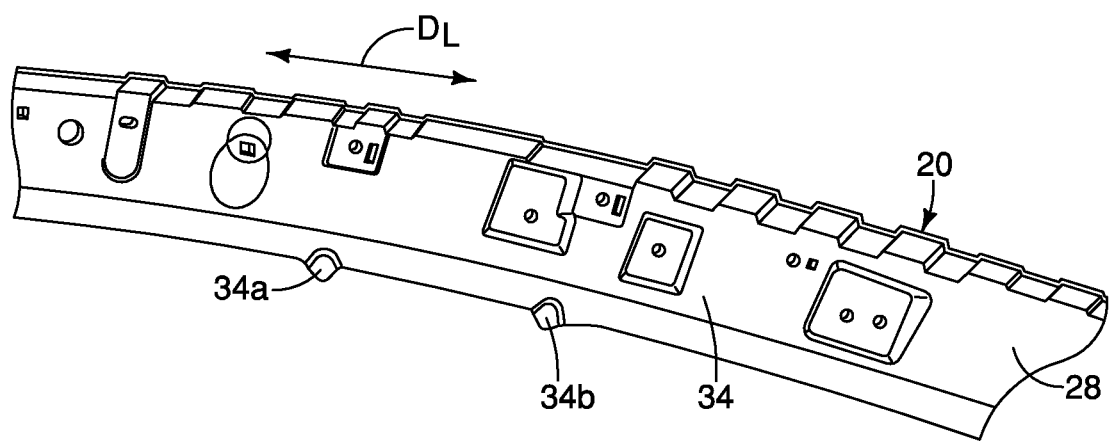
FIG. 5 is a perspective view of a portion of the side roof rail removed from the vehicle body structure in accordance with the exemplary embodiment.

As shown in FIGS. 3, 4 and 5, the side roof rail 28 of the roof structure 20 has an inboard surface 34 that extends in the vehicle longitudinal direction $D_L$. As viewed from within the passenger compartment of the vehicle body structure 12, the inboard surface 34 is slightly concaved and is inclined relative to vertical such that a lower edge of the inboard surface 34 is located outboard of an upper edge of the inboard surface 34. The lower edge of the side roof rail 28 includes a pair of protrusions 34a and 34b. As shown in FIG. 3, when the inboard panel 26 of the B-pillar 16 is attached to the side roof rail 28, the inboard panel 26 is located between the protrusions 34a and 34b.

The inboard panel 26 of the B-pillar 16 has an upper end 36 that is shaped and dimensioned to fit between the protrusions 34a and 34b and overlay a portion of the inboard surface 34 of the side roof rail 28. The upper end 36 of the inboard panel 26 of the B-pillar 16 is welded to the side roof rail 28 in a conventional manner. As shown in FIG. 3, the B-pillar 16 extends downward from the side roof rail 28. The upper end 36 of the inboard panel 26 can be provided with a distal portion 36a that is angularly offset from the remainder of the upper end 36 to cover and contact the lower edge of the side roof rail 28. The distal portion 36a is welded to the side roof rail 28. As described below, the bracket 32 is connected to the distal portion 36a via welds.

A description of the bracket 32 is now provided with initial reference to FIGS. 3-10. The bracket 32 has a first portion 40, a central portion 41 and a second portion 42. The first portion 40 includes a first rib 44 and a second rib 46 spaced apart from the first rib 44. The first rib 44 and the second rib 46 extend from and along the first portion 40 of the bracket 32 upward toward the second portion 42 of the bracket 32. The first portion 40 of the bracket 32 further defines an opening or slot 48 located between the first rib 44 and the second rib 46. The slot 48 of the first portion 40 of the bracket 32 is dimensioned to provide a predetermined rigidity to the bracket 32 in response to side impacting forces acting on a lateral side of the vehicle 10, proximate the B-pillar 32. Changes to the overall size of the slot 48 attenuates the overall strength of the first portion 40 and the central portion 41.

Figure 6:
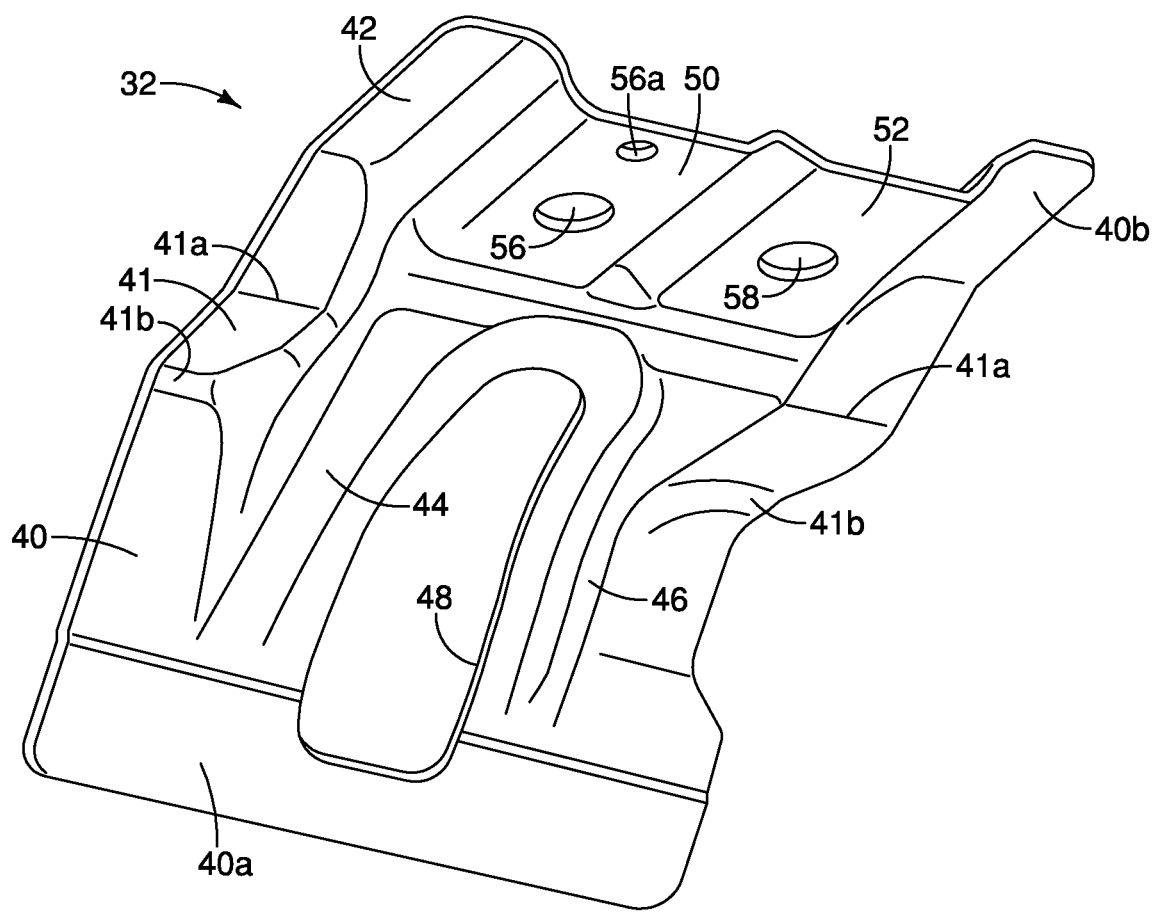
FIG. 6 is a perspective view of a downward facing surface of the bracket with the bracket removed from the vehicle body structure in accordance with the exemplary embodiment.
Figure 7:
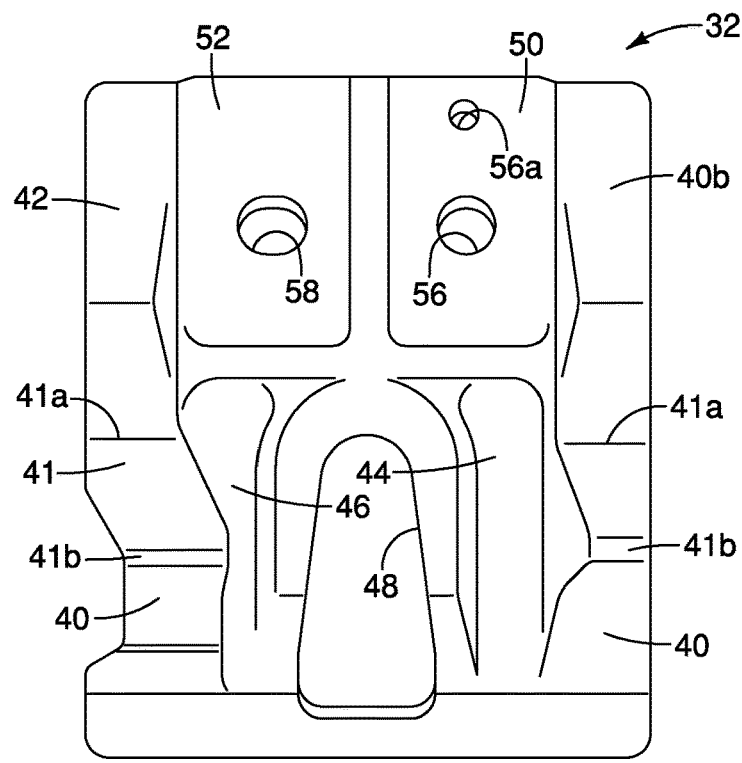
FIG. 7 is a top view of the bracket removed from the vehicle body structure showing a downward facing surface of the bracket in accordance with the exemplary embodiment.
Figure 8:
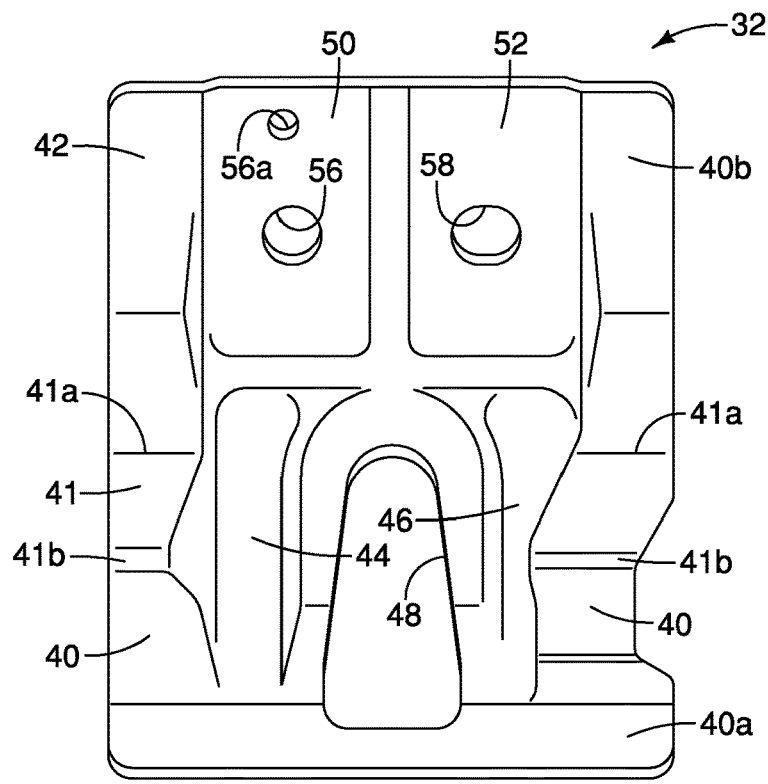
FIG. 8 is a bottom view of the bracket removed from the vehicle body structure showing an upward facing surface of the bracket in accordance with the exemplary embodiment.
Figure 14:
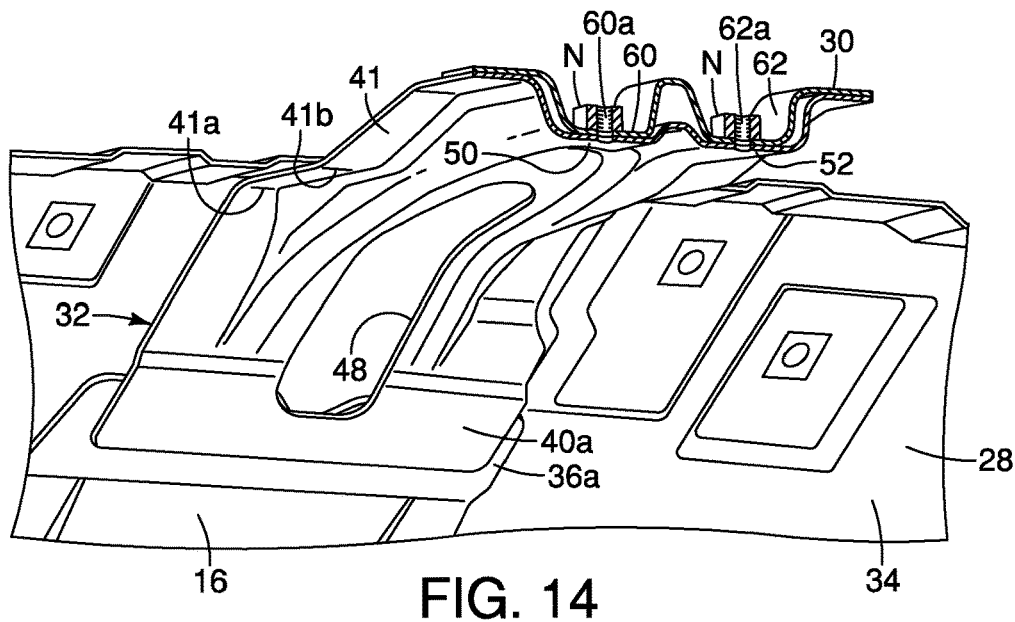
FIG. 14 is a perspective cross-sectional view of the intersection area showing the roof bow and bracket in cross-section with ribs of the roof bow overlaying portions of ribs of the bracket in accordance with the exemplary embodiment.
Figure 17:
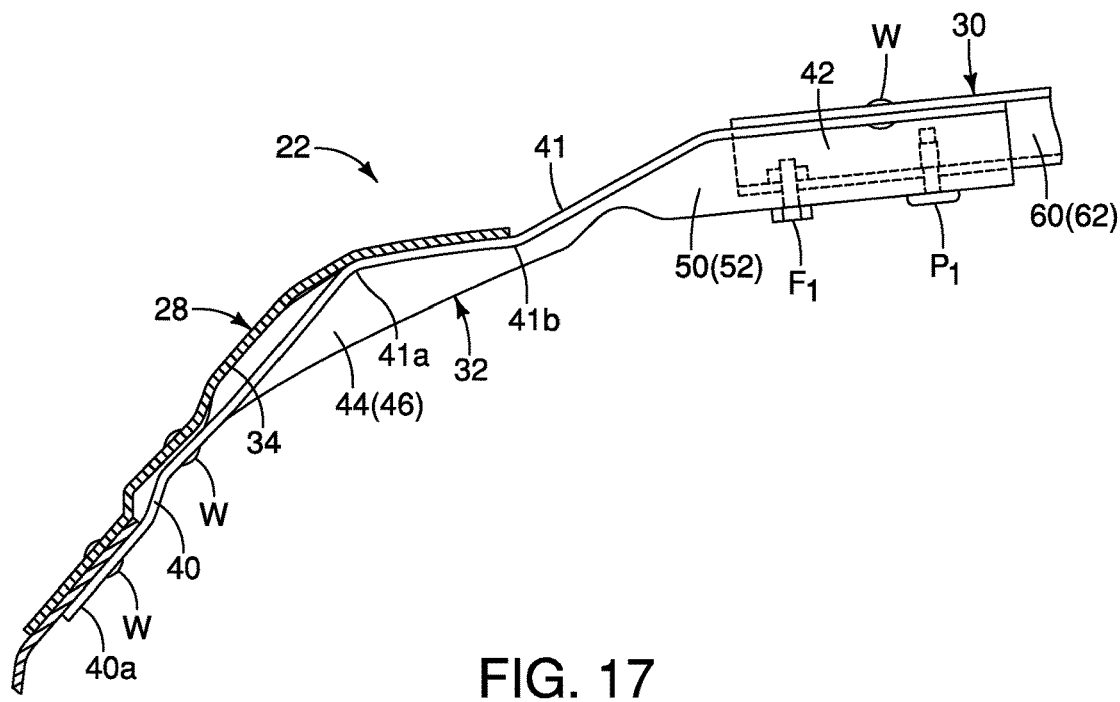
FIG. 17 is a cross-sectional view of the intersection area of the vehicle body structure showing the B-pillar, the roof side rail, the bracket and the roof bow in a fully assembled state in accordance with the exemplary embodiment.
Figure 18:
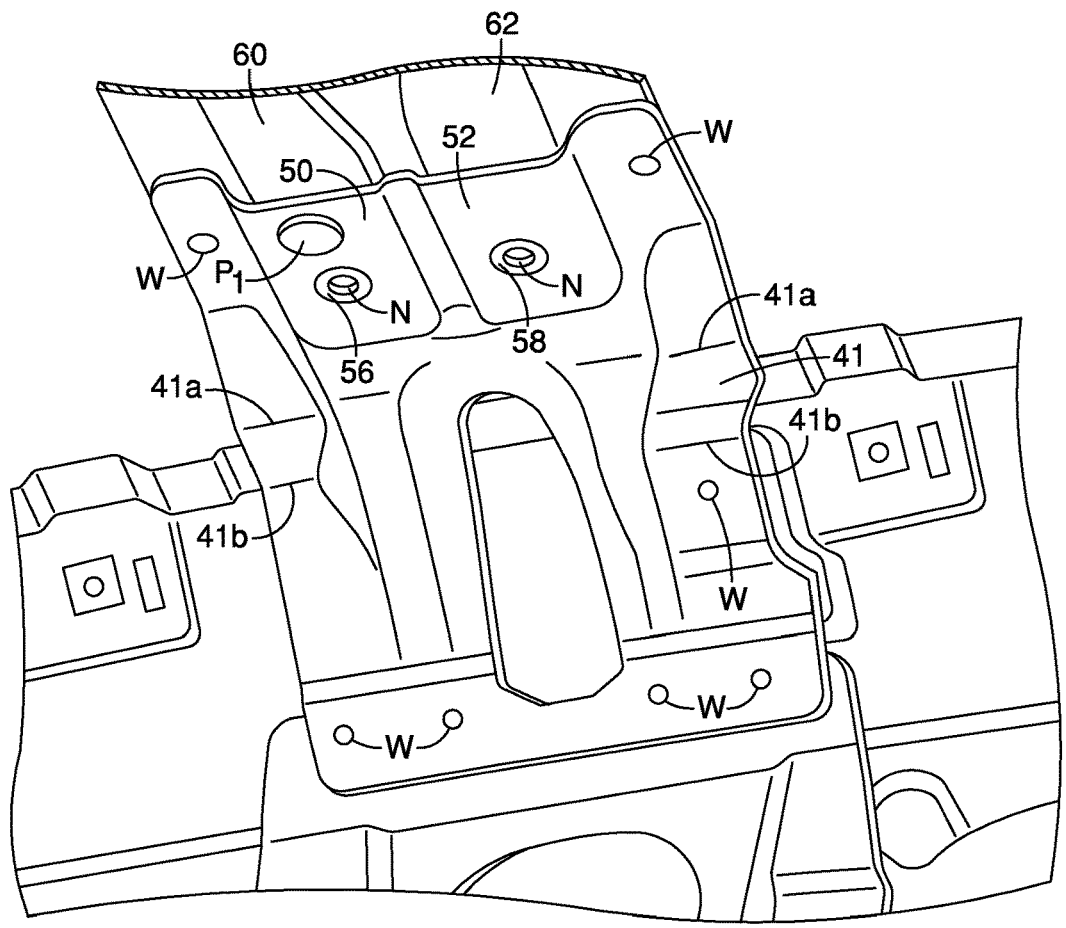
FIG. 18 is a perspective cross-sectional view of the intersection area from a location rearward relative to the B-pillar showing the roof bow and bracket in cross-section with ribs of the roof bow overlaying portions of ribs of the bracket in accordance with the exemplary embodiment.

The first portion 40 is fixedly attached to the upper end 36 (upper end portion) of the B-pillar 16 as shown in FIGS. 3, 14 and 18. In the depicted embodiment, a lower section 40a of the first portion 40 overlays and is fixedly attached to the distal portion 36a of the upper end 36 of the B-pillar 16 via four welds W, as shown in FIG. 18. As shown in FIGS. 4, 6 and 17, the bracket 32 has an overall arcuate or curved shape such that the first portion 40 and the second portion 42 of the bracket 32 are angularly offset from one another.

The central portion 41 of the bracket 32 overlays the inboard surface 34 of the side roof rail 28 but has limited connection thereto. The central portion 41 includes first bends 41a (bent or curved sections of the central portion 41) and second bends 41b. One of the first bends 41a and one of the second bends 41b are located on a forward portion of the bracket 32 adjacent to the first rib 44. The others of the first bends 41a and the second bends 41b are located on a rearward portion of the bracket 32 adjacent to the second rib 46.

Figure 9:
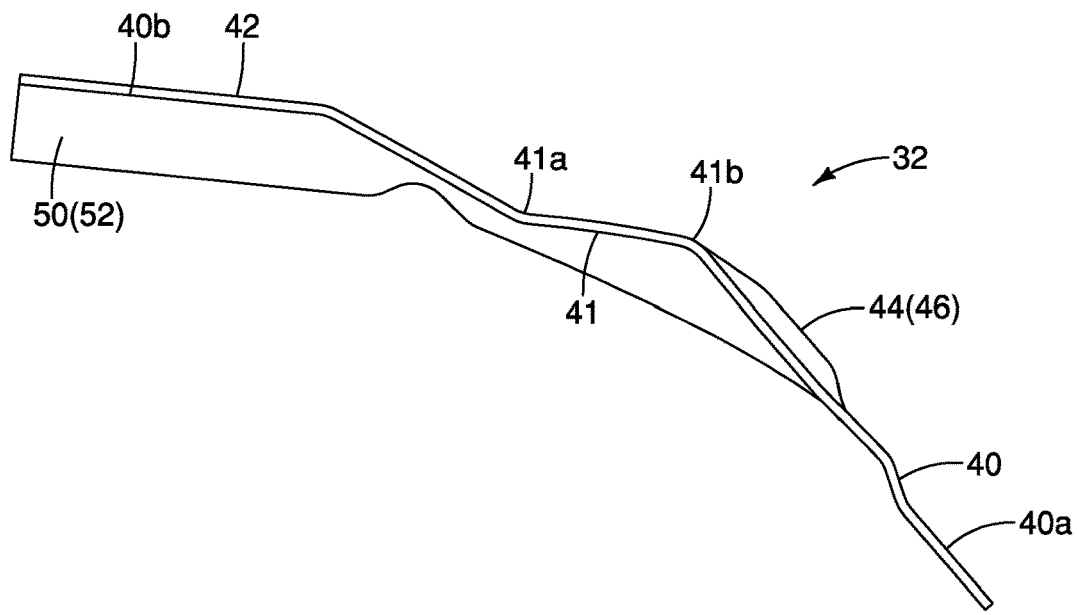
FIG. 9 is a perspective view of the bracket removed from the vehicle body structure showing the downward facing surface of the bracket in accordance with the exemplary embodiment.
Figure 10:
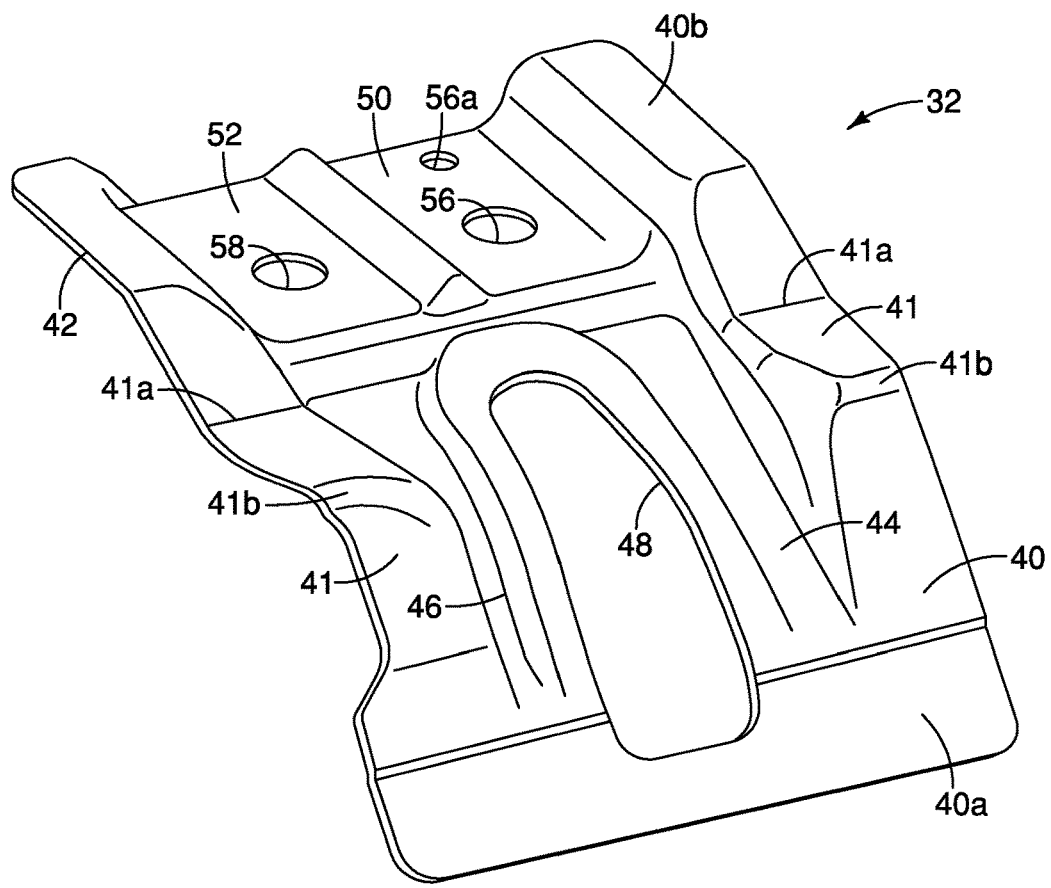
FIG. 10 is another perspective view of an upward facing surface of the bracket with the bracket removed from the vehicle body structure in accordance with the exemplary embodiment.

As shown in FIG. 9, surfaces of the central portion 41 that define each of the first bends 41a are angularly offset from one another by an obtuse angle that is approximately 160 degrees (plus or minus 10 degrees). The surfaces of the central portion 41 at the second bends 41b are also angularly offset from one another by an obtuse angle that is approximately 135 degrees (plus or minus 10 degrees).

The central portion 41 is welded to the inboard surface 34 of the side roof rail 28 via a single weld W located adjacent a rearward edge of the central portion 41 and the second rib 46 below the first and second bent sections 41a and 41b, as shown in FIG. 18. The purpose of the first bends 41a and the second bends 41b is described below.

The second portion 42 of the bracket 32 extends inboard of the side roof rail 28 and has two ribs, a third rib 50 and a fourth rib 52. The third rib 50 and the fourth rib 52 extend in an outboard direction from a distal end of the second portion 42, The first rib 50 includes a first opening 56 and the second rib 52 includes a second fastener opening 58 that are dimensioned to receive fasteners $F_1$, as described in greater detail below. The first rib 50 also includes a smaller opening 56a that receives an alignment pin $P_1$ (FIG. 17), as is also described further below.

A description of the roof bow 30 of the roof structure 20 is now provided with reference to FIGS. 3-4, 11-12 and 14-17. The roof bow 30 is a structural element of the roof structure 20. The roof bow 30 extends in a vehicle lateral direction (side to side direction) perpendicular to the vehicle longitudinal direction $D_L$. There are a plurality of the roof bows 30 within the roof structure 20 of the vehicle body structure 12. However, only the roof bow 30 that extends from one of the B-pillars 16 to the other of the B-pillars 16 is described herein.

Figure 11:
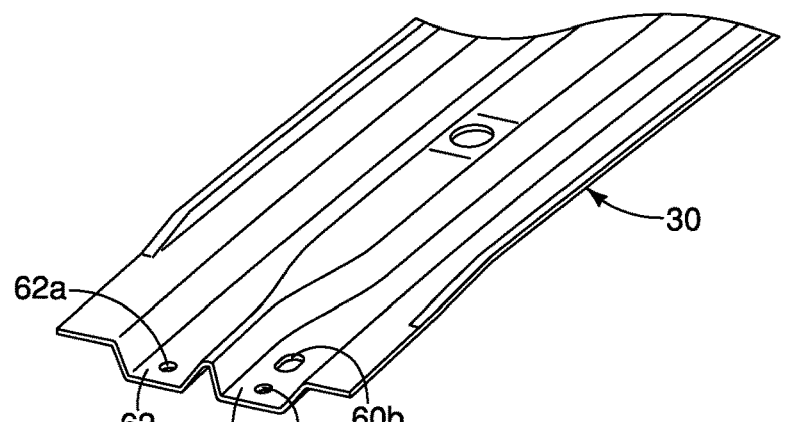
FIG. 11 is a perspective view of an outboard portion of the roof bow removed from the vehicle body structure in accordance with the exemplary embodiment.
Figure 12:
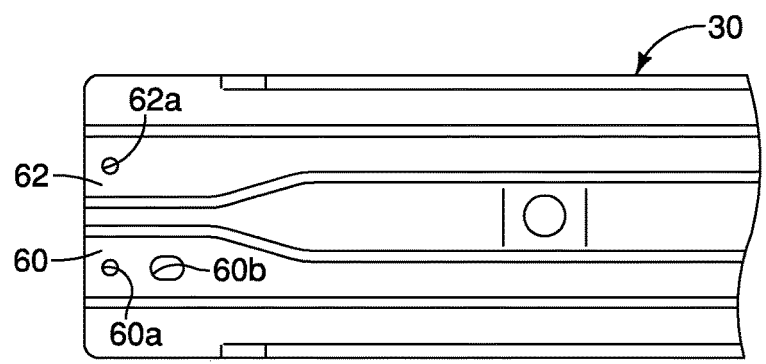
FIG. 12 is a top view of the outboard portion of the roof bow removed from the vehicle body structure in accordance with the exemplary embodiment.
Figure 13:
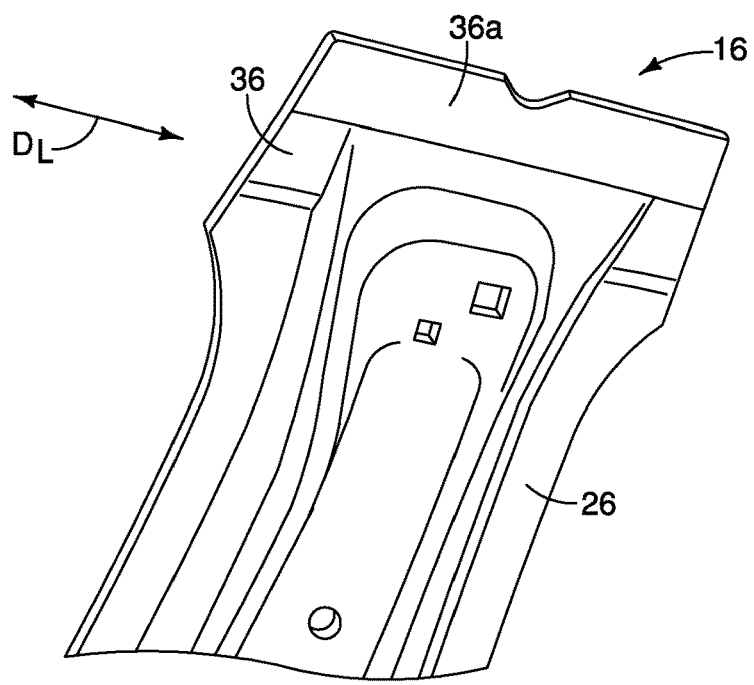
FIG. 13 is a perspective view of an upper end of an inboard panel of the B-pillar removed from the vehicle body structure in accordance with the exemplary embodiment.

As shown in FIGS. 11-12, 14-15 and 17-18, the roof bow 30 is an elongated member extending from one lateral side of the vehicle 10 to the other lateral side of the vehicle supporting a roof panel or roof panels of the roof structure 20. The roof bow 30 is formed with a pair of ribs 60 and 62. The ribs 60 and 62 extend the entire length of the roof bow 30 but are wider at outboard ends of the roof bow 30, as shown in FIGS. 11 and 12. The rib 60 includes an opening 60a and threaded nut N. The nut N can be welded to the rib 60 above and axially aligned with the opening 60a. Similarly, the rib 62 includes an opening 62a and threaded nut N. The nut N can be welded to the rib 62 above and axially aligned with the opening 62a. The rib 60 also defines an alignment opening 60b. As shown in FIG. 17, an alignment pin $P_1$ is force fitted into the opening 56a of the third rib 50 of the second portion 42 of the bracket 32. When the roof bow 30 is installed to the bracket 32, the alignment pin $P_1$ extends through the opening 60b making it easier to align the fasteners $F_1$ with the nuts N and thread the fasteners $F_1$ into the nuts N. along with the fasteners F1, the outer side flanges of the roof bow 30 are welded via welds W to outer side flanges of the bracket 32, as shown in FIG. 18. Thus, the fasteners $F_1$ and the two welds W attach the roof bow 30 to the bracket 32. The fasteners $F_1$ are located outboard of the welds W. In other words, the fasteners $F_1$ and the welds W are not required to be aligned with one another, but, in an alternative embodiment can be in line with one another. In the depicted embodiment, the welds W are offset from the fasteners $F_1$ in the inboard/outboard directions, as shown in FIG. 18. Specifically, the fasteners $F_1$ are located inboard of the welds W.

Figure 15:
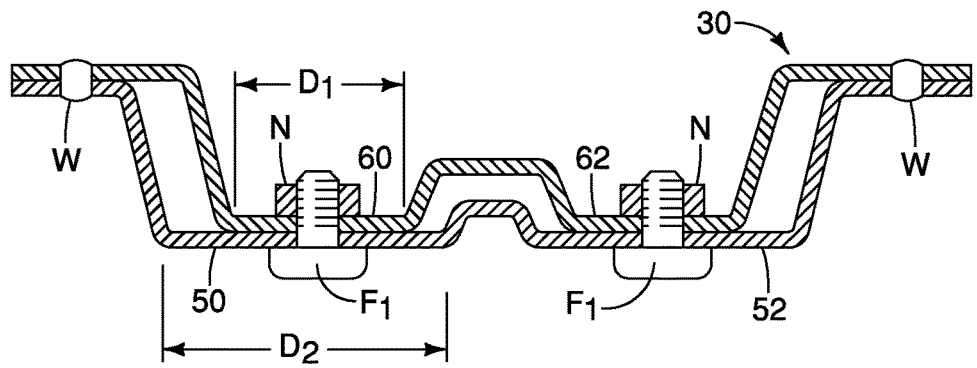
FIG. 15 is a cross-sectional view of the roof bow and the bracket showing fasteners attaching the roof bow to the bracket in accordance with the exemplary embodiment.
Figure 16:
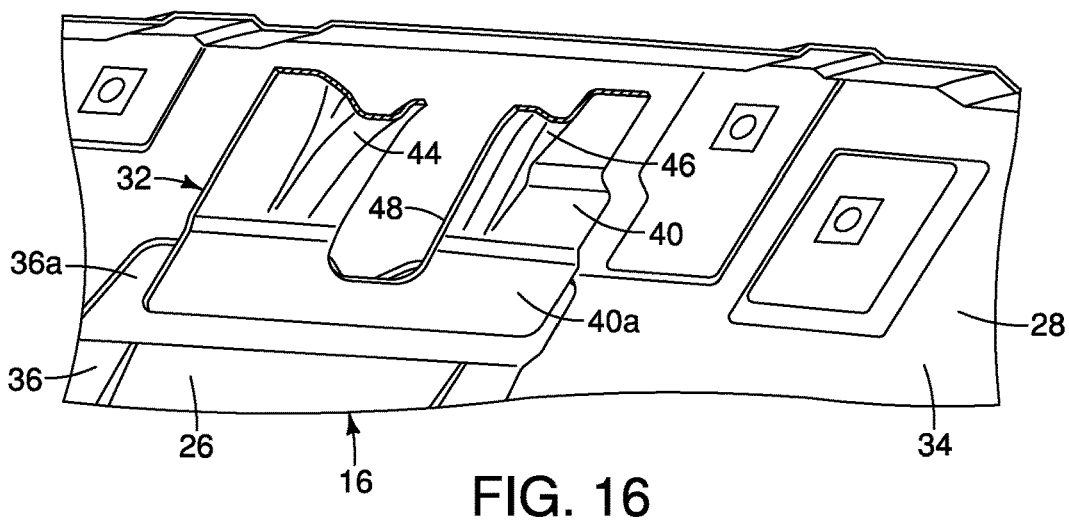
FIG. 16 is a perspective cross-sectional view of the intersection area showing first and second ribs of the first portion of the roof bow in accordance with the exemplary embodiment.

When the roof bow 30 is installed to the bracket 32, the rib 60 overlays a portion of the upper surface of the third rib 50 of the second portion 42 of the bracket 32. Similarly, the rib 62 overlays a portion of the upper surface of the fourth rib 52 of the second portion 42 of the bracket 32. As shown in FIG. 15, the width of the rib 60 at the nut N is a distance $D_1$. The width of the rib 62 is identically dimensioned at the nut N, as shown in FIG. 15. The width of the rib 50 at the nut N (and fastener $F_1$) is a distance $D_2$, as shown in FIG. 15. The width of the rib 52 at the nut N is also the distance $D_2$. Consequently, at the fastener $F_1$ and the nut N, the rib 60 and rib 50 (as well as the rib 62 and rib 52) only mate along horizontal surfaces. The upwardly extending surfaces of the rib 60 are spaced apart from adjacent upwardly extending surfaces of the rib 50. Similarly, the upwardly extending surfaces of the rib 62 are spaced apart from adjacent upwardly extending surfaces of the rib 52.

Hence, the ribs 60 and 62 of the roof bow 30 overlay but do not mate with the ribs 50 and 52 of second portion 42 of the bracket 32.

As is also shown in FIG. 17, there are four welds W that fix the lower section 40a of the bracket 32 to the distal portion 36a of the upper end 36 of the B-pillar 16. There is only one weld W along a side flange of the first portion 40 (adjacent to the second rib 46) that fixes the bracket 32 to the roof side rail 28. More specifically, the attachment between the bracket 32 and the B-pillar 16 is significantly stronger than the attachment between the bracket 32 and the roof side rail 28. Further, the attachment between the upper section 40b of the bracket 32 and the roof rail 30 includes the two fasteners F1 and the two welds W. Hence, the attachment between the bracket 32 and the roof rail 30 is significantly stronger than the attachment between the bracket 32 and the roof side rail 28. These differing strengths between the attachment locations of the bracket 32 to each of the B-pillar 16, the side roof rail 28 and the roof bow 30 provides attenuates absorption of impact force by the bracket 32 during a side impact event where impact energy is applied to the side of the vehicle 10 proximate or in alignment with the B-pillar 16.

Figure 19:
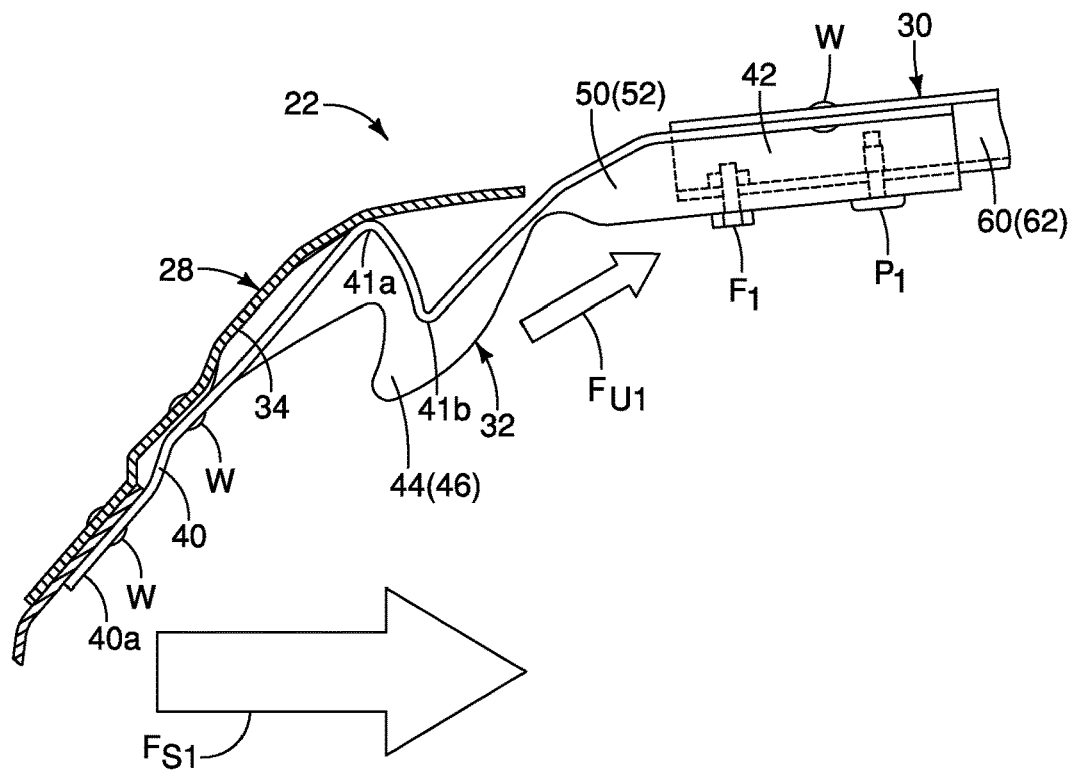
FIG. 19 is another cross-sectional view of the intersection area of the vehicle body structure similar to FIG. 17 showing the B-pillar, the roof side rail, the bracket and the roof bow after an impact event where a portion of the bracket has collapsed in a predetermined manner in an area adjacent to and along the side roof rail in accordance with the exemplary embodiment.

Specifically, as shown FIG. 19, during a side impact event where impact forces are applied to one of the B-pillars 16, the impact force are at least partially transmitted through the B-pillar 16 and to the inboard panel 26 of the B-pillar 16. Some of the transmitted impact forces is further transmitted to the bracket 32. In response to the impact forces, the roof bow 30 receives a portion of the impact forces. Since the bracket 32 is only attached to the side roof rail 28 by a single weld W, the attachment bond between the bracket 32 and the side roof rail 28 has only a small degree of resistance to shear forces, as compared to the multiple welds between the inboard panel 26 and the side roof rail 28 and the lower section 40a of the bracket 32. Further, the attachment bond between the upper section 40b of the bracket 32 and the roof bow 30 is significantly stronger that the single weld between the bracket 32 and the side roof rail 28. As a result of these differing attachment strengths, the presence of the slot 48 and the first and second bends 41a and 41b of the bracket 32, the bracket 32 can collapse along the first and second bends 41a and 41b bending in an accordion-like movement, as shown in FIG. 19. Further, as indicated by the arrow representing horizontal impact forces $F_{S1}$ and the arrow representing upwardly directed impact forces $F_{U1}$, the horizontal impact forces $F_{S1}$ include a majority the arrow representing upwardly directed impact forces $F_{U1}$, There are advantages to this arrangement. The amount of overall deformation of the vehicle body structure 12 can be minimized and be confined to the intersecting area 22 in response to most side impact events. Such an arrangement can limit or minimize, and possibly eliminate any deformation to, for example, the roof structure 20.

Figure 20:
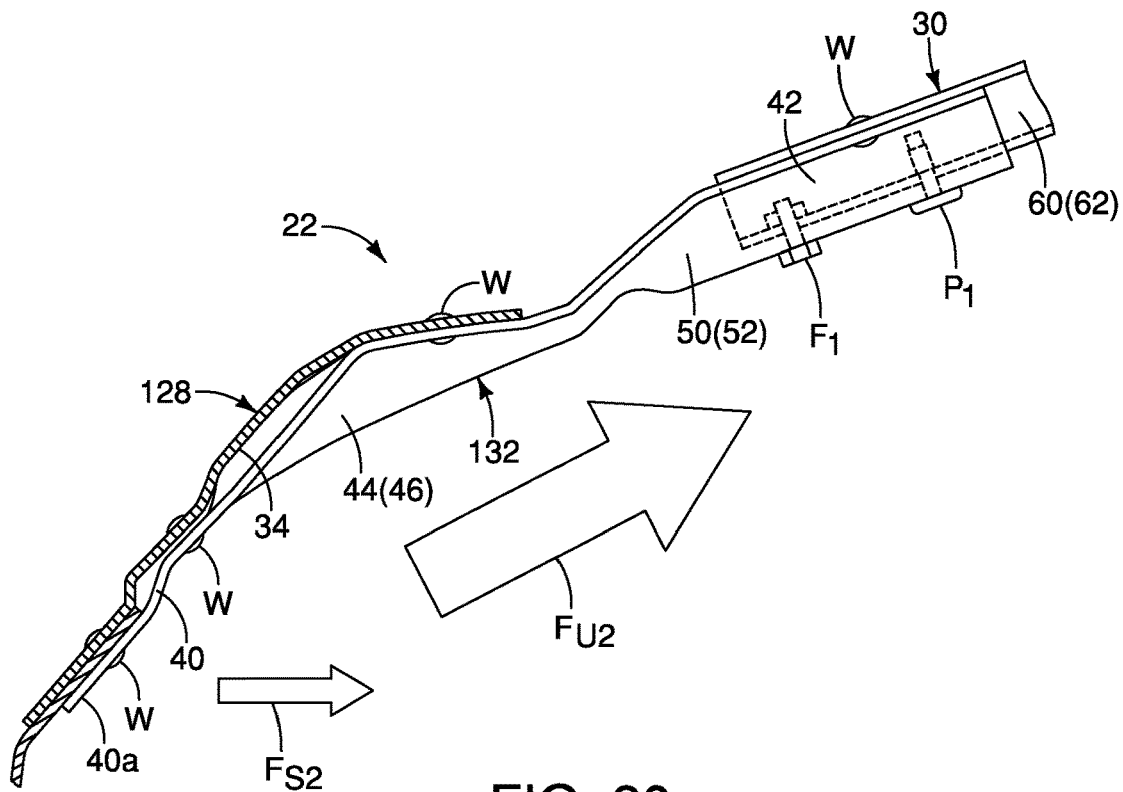
FIG. 20 is a cross-sectional view of an intersection area of a prior art vehicle body structure where the B-pillar has stronger attachments to the roof side rail such that in response to an impact event impact energy causes a roof bow to deform in accordance with the exemplary embodiment.

FIG. 20 shows an intersecting area of a vehicle that includes a side roof rail 128 and a bracket 132 where the bracket 132 is welded to the side roof rail 128 at a plurality of location making the bond strength of the attachment between the side roof bracket 128 and the bracket 132 significantly stronger than in the arrangement described above with reference to FIGS. 1-19. As shown in FIG. 20, since the bracket 132 has a stronger attachment to the side roof rail 128, upwardly directed impacting forces $F_{U2}$ are much greater that horizontal impact forces $F_{S2}$. Consequently, the roof bow 130 is deformed, in particular in a mid-portion (not shown) thereof, such that the outboard ends of the roof bow 130 bend upward in an inboard direction causing corresponding deformation to other elements of the roof structure of the depicted vehicle body structure.

The vehicle 10 includes many conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
a side roof rail having an inboard surface extending in a vehicle longitudinal direction;
a roof bow extending in vehicle inboard and outboard directions toward the side roof rail;
a B-pillar having an upper end portion that overlays a portion of the inboard surface of the roof rail, the B-pillar extending downward from the roof rail; and
a bracket having a first portion and a second portion, the first portion being fixedly attached to the upper end portion of the B-pillar, the second portion being fixedly attached to an outboard end of the roof bow such that the roof bow is spaced apart from the side roof rail and the B-pillar, the bracket further having a first rib, and a second rib spaced apart from the first rib, the first rib and the second rib extending from the first portion of the bracket upward toward the second portion of the bracket, the first portion of the bracket further defining a slot located between the first rib and the second rib.

2. The vehicle body structure according to claim 1, wherein
the first portion of the bracket is fixedly attached to the inboard surface of the side roof rail.

3. The vehicle body structure according to claim 1, wherein
the slot is dimensioned to provide a predetermined rigidity to the bracket in response to side impacting forces.

4. The vehicle body structure according to claim 1, wherein
the first portion and the second portion of the bracket are angularly offset from one another.

5. The vehicle body structure according to claim 1, wherein
the roof bow is attached to the second portion of the bracket by mechanical fasteners.

6. The vehicle body structure according to claim 1, wherein
the first portion is further fixedly attached to the inboard surface of the side roof rail.

7. The vehicle body structure according to claim 4, wherein
the first portion of the bracket is fixedly attached to the inboard surface of the side roof rail via a single weld.

8. The vehicle body structure according to claim 1, wherein
the bracket has two ribs outboard from a distal end of the second portion, and
the roof bow includes a pair of ribs that overlay but do not mate with the two ribs of second portion of the bracket.

9. A vehicle body structure, comprising:
a side roof rail having an inboard surface extending in a vehicle longitudinal direction;

a B-pillar having an upper end portion that overlays and is attached to a portion of the inboard surface of the side roof rail, the B-pillar extending downward from the roof rail;

a bracket having a first portion, a center portion and a second portion, the first portion being fixedly attached to an inboard surface of the upper end of the B-pillar, the second portion of the bracket extending inboard of the side roof rail and having two ribs that extend in an outboard direction along a distal end of the second portion, the center portion of the bracket includes bent portions, such that in response to side impact forces, the center portion of the bracket deforms by folding along the bent portions collapsing with accordion bellows-like movement; and a roof bow having a pair of ribs that overlay but do not mate with the two ribs of second portion of the bracket, the roof bow extending laterally inboard from the bracket and is fixedly attached to the second portion of the bracket.

10. The vehicle body structure according to claim 9, further comprising the first portion of the bracket overlays and is welded to the upper end portion of the B-pillar.

11. The vehicle body structure according to claim 9, wherein the first portion and the second portion of the bracket are angularly offset from one another.

12. The vehicle body structure according to claim 11, wherein the center portion of the bracket is located between the first portion and the second portion, the center portion being fixed to the side roof rail by a single weld.

13. The vehicle body structure according to claim 12, wherein the bracket has a first rib and a second rib spaced apart from the first rib, the first rib and the second rib extending from the first portion of the bracket upward toward the second portion of the bracket, with a slot defined between the first rib and the second rib, the slot being dimensioned to provide a predetermined rigidity to the bracket in response to side impacting forces.

14. The vehicle body structure according to claim 13, wherein the center portion of the bracket includes bent portions, such that in response to the side impact forces, the center portion of the bracket deforms by folding along the bent portions collapsing with accordion bellows-like movement.

15. A vehicle body structure, comprising:

a side roof rail having an inboard surface extending in a vehicle longitudinal direction;

a B-pillar having an upper end portion that overlays a portion of the inboard surface of the roof rail, the B-pillar extending downward from the roof rail;

a bracket having a first portion, a center portion and a second portion that are angularly offset from one another, the first portion being fixedly attached to the upper end portion of the B-pillar, the center portion of the bracket includes bent portions, such that in response to side impact forces, the center portion of the bracket deforms by folding along the bent portions collapsing with accordion bellows-like movement; and a roof bow extending laterally inboard from roof rail and is fixedly attached to the second portion of the bracket.

16. The vehicle body structure according to claim 15, wherein the bracket has a first rib, and a second rib spaced apart from the first rib, the first rib and the second rib extending from the first portion of the bracket upward toward the second portion of the bracket with a slot defined between the first rib and the second rib, the slot being dimensioned to provide a predetermined rigidity to the bracket in response to the side impacting forces.

17. The vehicle body structure according to claim 15, wherein the roof bow attached to the second portion of the bracket by mechanical fasteners.

18. The vehicle body structure according to claim 15, wherein the first portion of the bracket is fixedly attached to the upper end portion of the B-pillar and the center portion is attached to the side roof rail by a single weld.

19. The vehicle body structure according to claim 1, wherein the bracket includes a center portion having bent portions, such that in response to side impact forces, the center portion of the bracket deforms by folding along the bent portions collapsing with accordion bellows-like movement.

* * * * *